Jan. 20, 1953  J. C. MARLOW  2,625,948

DELAYED-ACTION PULSATOR VALVE

Filed March 1, 1949 2 SHEETS—SHEET 1

JOHN C. MARLOW
*INVENTOR.*

BY *John P. Murphy*

ATTORNEY

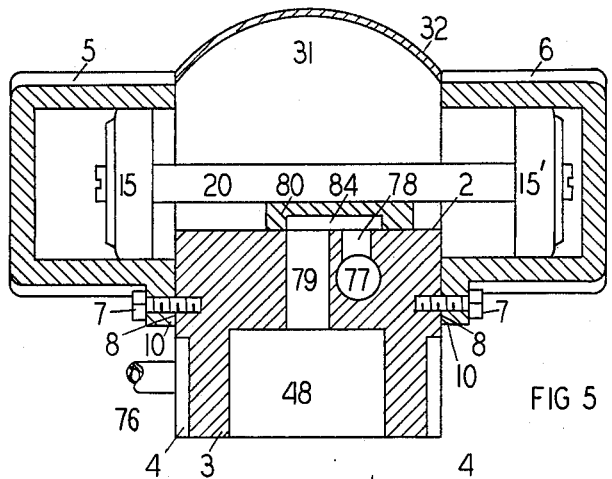
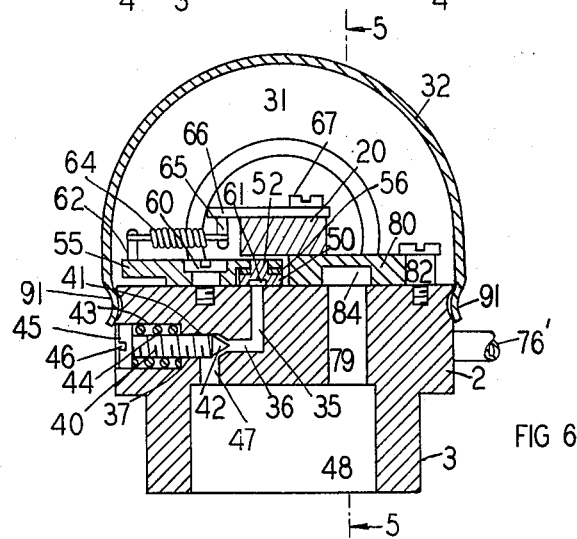
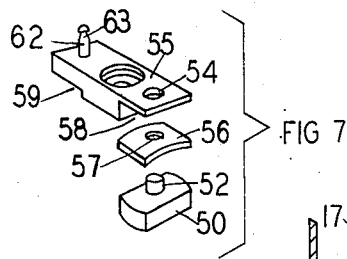
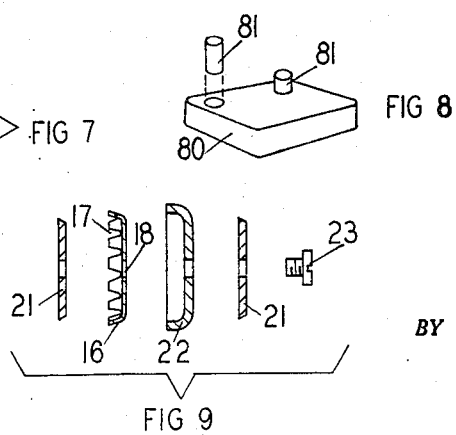

Patented Jan. 20, 1953

2,625,948

UNITED STATES PATENT OFFICE 2,625,948

DELAYED-ACTION PULSATOR VALVE

John C. Marlow, Mankato, Minn.

Application March 1, 1949, Serial No. 78,955

2 Claims. (Cl. 137—104)

My invention relates to a delayed action valve for the pulsator of a milking machine and I declare the following to be a full, clear, concise and exact description thereof sufficient to enable anyone skilled in the art to which it appertains to make and use the same, reference being had to the accompanying drawings in which like characters refer to like parts throughout.

The object of the invention is to provide an automatically delayed action valve used in the pulsator of a milking machine, whereby the pistons of the pulsator will be enabled to make a complete stroke in their respective cylinders, whereby to insure the most effective use of the pulsator.

The object will be understood by referring to the drawings in which

Fig. 5 is a section taken on the line 5—5 of Fig. 6.

Fig. 6 is an enlarged transverse section taken on the line 6—6 of Fig. 3.

Fig. 7 is an enlarged exploded view of the reversing valve and related parts used in the structure.

Fig. 8 is an enlarged detail view showing a perspective of a floating valve used in the device.

Fig. 9 is an exploded view of a piston employed in the device.

Figure 1:
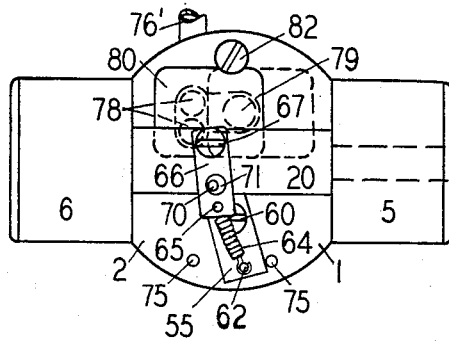
Fig. 1 is a plan view of the device.

Referring more particularly to the drawings the pulsator contemplates a cylindrical casing 1 comprising an annular upper part 2 and a reduced annular lower part 3 that is fluted at 4 to fit into the cover of a milk pail, not shown.

Piston cylinders 5, 6 are bolted at 7 to opposite sides 8, 8 of upper part 2. To this end the opposite sides 8, 8 of part 2 are milled flat, whereby to present two parallel surfaces for the attachment of brackets 10, 10 formed integral with cylinders 5, 6. Threaded recesses are made in sides 8, 8 for the reception of bolts 7, 7.

Pistons 15, 15' are disposed in each of the cylinders 5, 6. Each of the pistons comprises a metal disk shaped member 16 having perforated sides 17 with a central aperture 18 that fits onto the reduced end of reciprocating rectangular piston bar 20. There are also flat metal disks 21, 21, a cup shaped leather washer 22 and headed bolt 23 that project through the assembled disk 21, washer 22, metal disk 16 and second disk 21 in that order, whereby to hold said parts to the end of rectangular piston bar 20.

The means for reciprocating 15, 15' contemplates an annular air suction passageway 25 made in each of the cylinders which opens at one end into arc shaped openings 26, 26' formed in each of the cylinders 5, 6 adjacent the end surface thereof. Passageways 25, 25' communicated with aligned annular passageways 27, 27' formed in the upper part 2 of casing 1 which are extended at right angles thereto at passageways or ports 30, 30' and open into the chamber 31 formed by cylinders 5, 6 and detachable cover 32, hereinafter mentioned.

Figure 4:
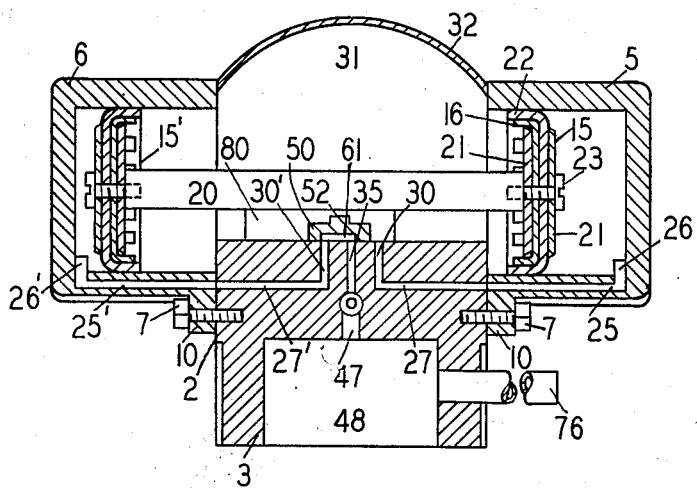
Fig. 4 is an enlarged section taken on the line 4—4 of Fig. 3.

The extended passageways 30, 30' are spaced apart as shown more particularly in Fig. 4.

A third slightly off alignment passageway 35 is made in between extended passageways or ports 30, 30' and leads directly downward and then at right angles thereto at 36, whereby it opens into a larger passageway 37 also made in part 2 in which is disposed the threaded shank 40 of an adjustable needle valve 42 that governs the degree of opening of passageway 36.

Larger passageway 37 is still further enlarged at 43 for accommodating coiled spring 44 disposed about the shank 40 of needle valve 42 which has a screw threaded engagement with upper part 2 of casing 1 at 41. The passageway at 43 opens to atmosphere and houses head 45 of needle valve 42. Head 45 has a slot 46 for the application of a screw driver, not shown, for turning valve 42. The regulation of needle valve 42 with respect to passageway 36 will determine the velocity with which pistons 15, 15' reciprocate.

A passageway or port 47 is made in upper part 2 of casing 1. It allows for communication between passageway 37 and interior chamber 48 formed in lower part 3 of casing 1.

The means for closing either one of ports 30, 30' with passageway 35 embodies a reversing valve 50 preferably made of a suitable composition and having a stud 52 formed integral therewith which extends up into aperture 54 in holder 55 with a loose fit. A flat convex spring 56 is disposed between the contiguous surface of holder 55 and reversing valve 50 for holding said valve 50 tightly against the upper flat surface of part 2 of casing 1. Stud 52 extends upward through a suitable aperture 57 in convex spring 56. Holder 55 is reduced at 58 for the reception of spring 56 and valve 50. It is reduced also at 59 to lessen friction with the flat surface of upper part 2.

Holder 55 pivots on countersunk headed bolt 60 that is threaded to a suitable recess in part 2 of casing 1. The under surface of reversing valve 50 has an elongated recess 61 forming a passageway that can connect either one of ports 30, 30' with passageway 35.

An upstanding lug 62 is driven with a tight fit into a suitable recess in valve holder 55 near its free end. Lug 62 has a groove 63 at its upper end in which is wound one end of a coiled spring 64. The opposite end of spring 64 is connected to a like stud 65 depending from plate 66 that is pivoted at the opposite end on headed bolt 67 engaging a threaded recess in rectangular piston bar 20 connecting pistons 15, 15'.

An upstanding lug 70 having a tight fit in bar 20 projects into an enlarged aperture 71 made in plate 66, whereby to limit its swing on its bolt or pivot 67. This limited swing of plate 66 will allow for a little lost motion in the reciprocation of pistons 15, 15', whereby to allow said pistons to complete their respective strokes, as hereinafter explained.

Upstanding lugs 75, 75 having a tight fit in upper part 2 of casing 1 limit the arc in which valve holder 55 can swing.

The means for causing a suction in chamber 48 contemplates nozzle 76 formed integral with and extending laterally from lower part 3 of casing 1. A hose, not shown, is slipped onto nozzle 76. Its other end is connected to a vacuum pump, also not shown.

The passageway or port 77 formed by nozzle 76' connects with two vertical twin passageways 78, 78 formed in part 2 and opening into the upper chamber 31. A third port 79 parallels passageways 78, 78 and communicates with both upper chamber 31 and lower chamber 48.

The means for closing the passageway between twin passageways or ports 78, 78 and 79 embodies a sliding valve 80 made of a suitable composition. It is disposed below piston bar 20 and held to move therewith by two upstanding lugs 81, 81 having a loose fit in valve 80 and extending with a tight fit up into recesses made in the under side of bar 20. A headed bolt 82 threaded in a recess in part 2 acts as a guide for valve 80.

Figure 3:
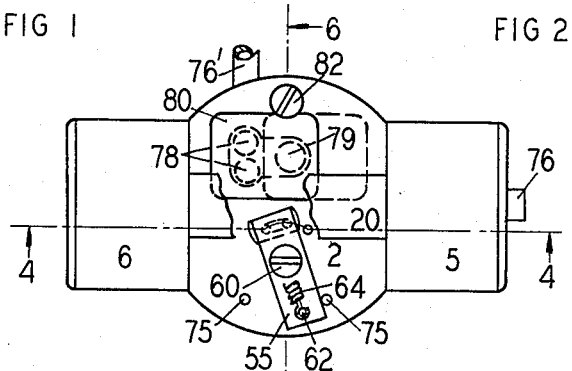
Fig. 3 is a plan view showing parts broken away.

The lower surface of valve 80 is recessed at 84, whereby when valve 80 is in full line position illustrated in Figs. 1 and 3 it will provide a continuous passageway from twin ports 78, 78 to port 79. When in dotted line position ports 78, 78 will be uncovered and open into upper chamber 31 or atmosphere.

Guide ridges or flutes 4, 4 are formed integral with the lower part 3 of casing 1 to fit complementary grooves in the throat of the milk pail, not shown, whereby to hold said casing 1 in correct relation thereto.

Detachable cover 32 is open at both ends. Its lower free edges 91, 91 are bent to form grooves for engaging the complementary edges of part 2 of casing 1.

*Operation*

Assuming the pump, not shown, is started to create a suction in chamber 48 of lower part 3 of casing 1 by way of nozzle 76 and assuming slide valve 80 and reversing valve 50 are in full line position illustrated in Figs. 1 and 3 then the suction will be created through port 47, passageway 37 past needle valve 42, passageways 36 and 35 through recess 61 on the under side of reversing valve 50 to the extended port 30' in Fig. 4 to passageway 27' to passageway 25' to opening 26' to the interior chamber of cylinder 6, as shown in full lines in Fig. 4, whereby to create a vacuum suction therein to draw piston 15' to the left. Simultaneously port 30 will be open to atmosphere to allow air into the chamber of cylinder 5 in back of piston 15 to destroy the vacuum therein.

Figure 2:
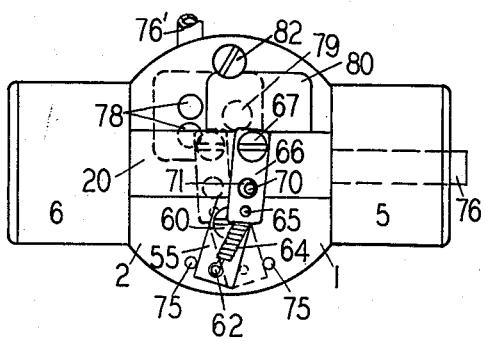
Fig. 2 is a plan view of the device showing movable parts in opposite position from that illustrated in Fig. 1.

With the movement of piston bar 20 towards the right as illustrated in Fig. 2, valve 80 will move therewith and uncover ports 78, 78 to atmosphere, whereby to collapse said inflation members.

As piston 15' reaches the end of its stroke in cylinder 6 lug 70 carried by piston bar 20 will make a delayed contact with the contiguous edge of plate or bar 66 bounded by enlarged aperture 71 and cause said bar 66 to exert a pull on spring 64 which will in turn swing holder 55 and reversing valve 50 to full line position illustrated in Fig. 2, whereby to close a suction line through ports 30 and 35 to create a suction in back of piston 15 and to expose passageway 30' to atmosphere. This will allow the air in back of piston 15' to destroy the vacuum therein.

As piston bar 20 moves to the left, valve 80 will close the suction line through ports 78, 78 and 79 to cause the expansion of said inflation members.

The above motions are repeated on each stroke of said pistons 15, 15'.

The speed of reciprocation can be governed by regulating needle valve 42 that controls passageways 36 and 35.

Having thus described my invention, what I claim as new and desire to secure by Letters Patent is as follows:

1. A delayed action valve for the pulsator of a milking machine comprising a casing having passageways therein, cylinders mounted to said casing, pistons operating in said cylinders, a piston bar connected to said pistons, a member pivotally mounted to said piston bar, a reversing valve pivotally mounted to said casing, a coil spring interconnecting said reversing valve with said first named member, said coil spring being connected to the reversing valve at a point beyond the pivotal mounting of the reversing valve, a lug attached to said piston bar, said first named member being porvided with an enlarged aperture located between the pivotal mounting of said member and the point of attachment of the coil spring, said lug contacting a side of the aperture when the piston bar is substantially at the end of its stroke prior to the reversal of the valve, whereby to allow said first named member to move independent of said piston bar to delay the action of the reversing valve and means for limiting the rotary movement of said reversing valve.

2. A delayed action valve for the pulsator of a milking machine comprising a casing having passageways therein, cylinders mounted to said casing, pistons operating in said cylinders, a piston bar connected to said pistons, a member pivotally mounted to said piston bar, a reversing valve pivotally mounted to said casing, a coil spring interconnecting said reversing valve with said first named member, said coil spring being connected to the reversing valve at a point beyond the pivotal mounting of the reversing valve, a lug attached to said piston bar, said first named member being provided with an enlarged aperture located between the pivotal mounting of said member and the point of attachment of the coil spring, said lug contacting a side of the aperture when the piston bar is substantially at the end of its stroke prior to the reversal of the valve, whereby to allow a limited motion of said plate independent of said piston bar to delay the action of said reversing valve and a lug attached to said casing for limiting the rocking motion of said reversing valve.

JOHN C. MARLOW.

REFERENCES CITED

The following references are of record in the file of this patent:

UNITED STATES PATENTS

| Number | Name | Date |
|---|---|---|
| 382,333 | Stirling | May 8, 1888 |
| 1,266,697 | Macartney | May 21, 1918 |
| 1,335,953 | Babson | Apr. 6, 1920 |
| 1,386,246 | Eklundh | Aug. 2, 1921 |
| 1,987,515 | Mortensen | Jan. 8, 1935 |
| 1,990,566 | Ramsden | Feb. 12, 1935 |
| 2,021,839 | Degerth | Nov. 19, 1935 |
| 2,304,746 | Anderson | Dec. 8, 1942 |